United States Patent
Berg

(10) Patent No.: US 8,687,720 B2
(45) Date of Patent: Apr. 1, 2014

(54) TREATMENT PROCESS OF A MULTICARRIER SIGNAL WITH FILTER BANKS FOR SYNCHRONISATION BY PREAMBLE

(75) Inventor: Vincent Berg, Meylan (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 91 days.

(21) Appl. No.: 13/426,544

(22) Filed: Mar. 21, 2012

(65) Prior Publication Data

US 2012/0243625 A1    Sep. 27, 2012

(30) Foreign Application Priority Data

Mar. 25, 2011    (FR) ...................................... 11 52481

(51) Int. Cl.
*H04K 1/10*    (2006.01)
*H04L 27/28*    (2006.01)

(52) U.S. Cl.
USPC ............................. 375/260; 375/259; 375/267

(58) Field of Classification Search
USPC ........................................................ 375/260
See application file for complete search history.

(56) References Cited

U.S. PATENT DOCUMENTS 8,498,542 B2 *    7/2013    Frankel et al. ................ 398/184
2009/0279422 A1 *    11/2009    Fonseka et al. ............... 370/215

OTHER PUBLICATIONS

Tobias Hidalgo Stitz, et al , Practical Issues in Frequency Domain Synchronization for Filter Bank Based Multicarrier Transmission, Communications, Control, and Signal Processing, 2008 ISCCSP 2008, 3rd International Symposium, IEEE, Piscataway, NJ, USA, Mar. 12, 2008, pp. 411-416.

Su Hu, et al , Preamble Design with ICI Cancellation for Channel Estimation in OFDM/OQAM System, IEICE Transactions on Communications, Communications Society, Tokyo, Japan, Jan. 1, 2010, vol. E93B, No. 1, pp. 211-214.

* cited by examiner

*Primary Examiner* — Erin File
(74) *Attorney, Agent, or Firm* — Blakely Sokoloff Taylor & Zafman LLP

(57) ABSTRACT

The invention relates to a treatment process of a signal received from a multi-carrier transmitter (1) with filter banks by a multi-carrier receiver (2) with filter banks, to perform synchronization from a preamble.

9 Claims, 6 Drawing Sheets

TREATMENT PROCESS OF A MULTICARRIER SIGNAL WITH FILTER BANKS FOR SYNCHRONISATION BY PREAMBLE

GENERAL TECHNICAL FIELD

The invention relates to the field of multicarrier digital communications with filter bank (i.e., « FilterBank MultiCarrier », (FBMC)) and relates more particularly to synchronisation of the preamble of OFDM/OQAM waveforms (i.e., « Orthogonal Frequency Division Multiplexing/Offset Quadrature Amplitude Modulation »).

PRIOR ART

Transmission systems use multi-carrier modulations to attain high spectral efficacy.

A widely used technique is OFDM modulation (i.e., « Orthogonal Frequency Division Multiplexing ») which is based on a fast Fourier transform (i.e., « Fast Fourier Transform », (FFT)) to distribute sub-carriers on the bandwidth of the transmission channel. According to this technique, all data applied to the input of the IFFT block and called symbol produces a signal block to be transmitted to the output of the IFFT. To limit interference a guard interval is inserted between each successive block.

Another multi-carrier technique is FBMC modulation (or OFDM/OQAM). The aim of this technique is to maximise the rate by combining the use of filter banks to divide the transmission channel into sub-channels. Such a technique is adapted to the same applications as OFDM.

In particular, FBMC modulation is well adapted to opportunist radio and more generally to broadband transmission of information in a frequency band limited to a radiomobile environment.

FBMC modulation is an alternative solution to OFDM as it proposes better spectral efficacy due to waveform localised in time and frequency but for which the orthogonality property is lost. To correct this orthogonality problem, in FBMC modulation OQAM symbols are transmitted at double the rhythm symbol of OFDM with guard interval and the orthogonality condition is released to the only real field.

In this way, FBMC modulation is a solution of interest to novel applications of opportunist radio.

A problem in deploying this technique is synchronisation, a problem inherent to all multi-carrier modulations.

In conventional terms, a preamble signal known from the receiver is transmitted prior to emission of useful data to synchronise a transmitter and a receiver. In this way, the receiver can determine synchronisation parameters from treatment of the preamble: temporal offsetting between the transmitted and received signal and characteristics of the propagation channel. The document by Fusco, T.; Petrella, A.; Tanda, M.: "*Data-aided symbol timing and CFO synchronization for filter bank multicarrier systems,*" *Wireless Communications*, IEEE Transactions on, vol. 8, no. 5, pp. 2705-2715, May 2009 discloses a synchronisation technique in time and in frequency by means of a preamble.

The same technique is described in greater detail in the document A. Petrella, <<*Synchronization algorithms for FBMC systems*>>, doctorate thesis, Université Frederic II de Naples, 2008/2009 focussing on synchronisation techniques of waveforms of FBMC type. This technique takes up the fundamental principles used in OFDM and summaries for example in the document by Morelli, M.; Kuo, C.-C. J.; Pun, M.-O.; "*Synchronization Techniques for Orthogonal Frequency Division Multiple Access (OFDMA): A Tutorial Review,*" *Proceedings of the IEEE*, vol. 95, no. 7, pp. 1394-1427, July 2007

The techniques described are all founded on an amplitude peak of an intercorrelation function of the received signal.

However, in receipt mode these techniques result in performances removed from the Cramer-Rao limit particularly over multipath channels.

In this way, with respect to synchronisation within the scope of FBMC modulation and OFDM/OQAM modulation in particular no known technique gives a satisfactory result.

PRESENTATION OF THE INVENTION

The invention proposes a synchronisation solution applied to FBMC modulation and in particular to OFDM/OQAM modulation.

To achieve this it utilises synchronisation by means of a preamble in the frequency domain.

According to a first aspect, the invention therefore relates to a treatment process of a received signal, from a multi-carrier transmitter with filter banks, by a multi-carrier receiver with filter banks, the process comprising the following steps:
 receipt of the multi-carrier signal, generated according to synthesis by filter bank of several sub-strings of OQAM symbols, the received signal comprising a synchronisation preamble known from the receiver;
 analysis by filter bank of the signal received so as to extract the preamble in the frequency domain;
 treatment of the resulting preamble to obtain estimation data of a propagation channel located between the transmitter and the receiver.

The process according to the invention enables more robust synchronisation than techniques of the prior art.

The process according to the invention exhibits very good performance in Galsoan channel conditions but also in multipath channel conditions.

According to an embodiment executing an inverse Fourier transform for calculating the impulse response of the channel the noise is advantageously distributed over all points, whereas the power of the channel is distributed over some points only.

According to another embodiment, the Fourier transform in receipt (FFT) can especially be shared with the Fourier transform inverse necessary for calculation of the impulse response of the channel, and the implementation cost of the technique is very low.

The process can be used for estimation of the channel and the residual error of carrier frequency.

Repetition of a sequence of BPSK type for generation of the preamble without other constraints advantageously and simply controls the interference generated on the imaginary part of the signal and makes implementation of the process less complex.

The process according to the first aspect of the invention can also exhibit one or other of the following characteristics:
 the treatment step consists of: correlating the preamble with a reference signal to obtain a correlation signal; determining, from the correlation signal and from the frequency response of the propagation channel an estimate of the time response of the propagation channel;
 the preamble of the signal is a sequence of BPSK symbols transmitted as preamble, the sequence of BPSK symbols having been pre-coded in OQAM on sending;
 the number of BPSK symbols is such that the preamble comprises at least two, preferably four OQAM symbols;

the reference signal comprises a succession of BPSK or QPSK symbols;

it comprises a sending step consisting of: converting a sequence of data into a number of sub-strings equal to the number of active carriers; converting each sub-string into a set of sequences of OQAM symbols; applying to the input of a synthesis filter bank the sequences of OQAM symbols to obtain a multi-carrier signal to be sent;

it comprises, after receipt of the signal, a pre-synchronisation step consisting of correlating the received signal with its rejoinder offset in time to obtain offsetting in frequency and in time between the transmitted and received signal, with analysis by filter banks being a function of the resulting offsettings;

analysis by filter bank consists of obtain several sub-strings of symbols constituting the preamble, with treatment of the preamble also consisting of converting the sub-string of symbols into a sequence of symbols;

filter banks comprise a fast Fourier transform module.

And according to a second aspect, the invention relates to digital communications systems comprising means for the executing a process according to the first aspect of the invention.

PRESENTATION OF FIGURES

Other characteristics and advantages of the invention will emerge from the following description which is purely illustrative and non-limiting and must be viewed in conjunction with the attached diagrams, in which.

DETAILED DESCRIPTION OF THE INVENTION

Figure 1:
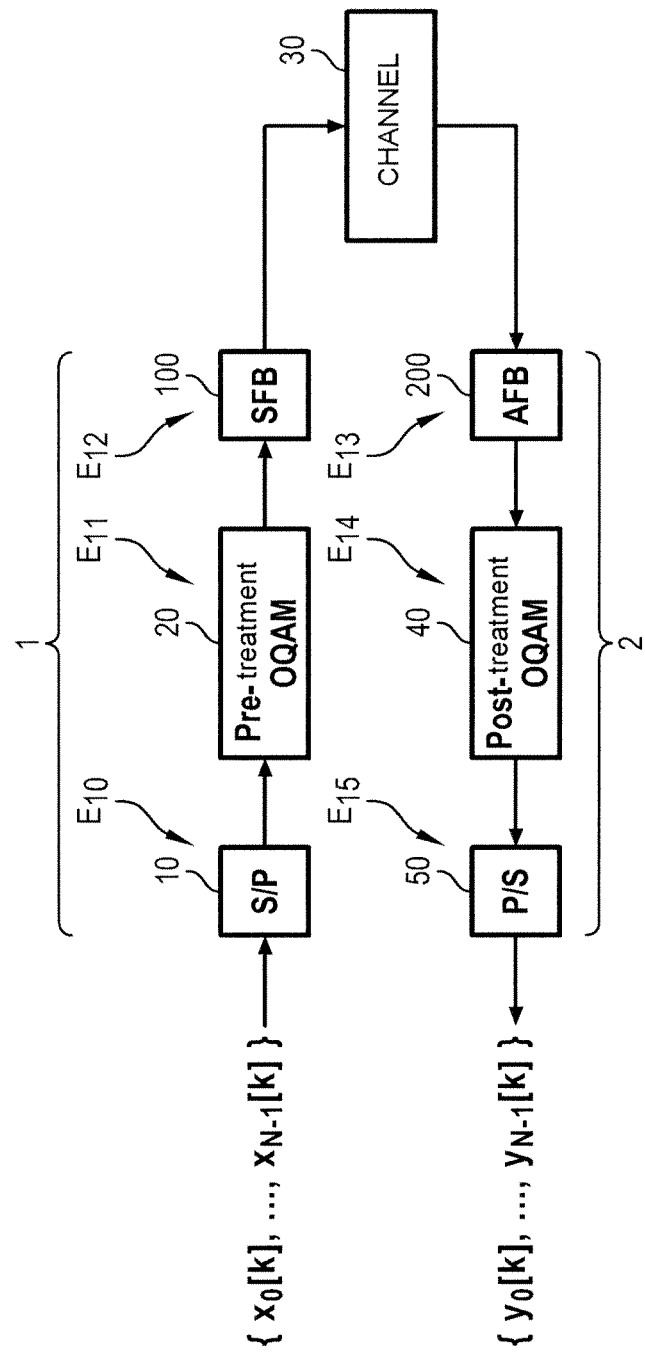
FIG. 1 illustrates a send/receive system according to the invention.

A block diagram of a multi-carrier communications system with filter bank (FBMC hereinbelow), according to an embodiment, is illustrated in FIG. 1.

This type of system conventionally comprises a transmitter 1, a receiver 2 and transmission channel 30 located between the transmitter 1 and the receiver 2.

At the level of the transmitter 1, on emission, a flow of N data $x_n[k]$ n=[0, N−1] series is applied E10 to a converter 10 series/parallel (S/P). The parallel flow is then applied E11 to an OQAM pre-treatment module 10 whereof the function is to convert the complex field to the real field of the QAM (i.e., « Quadrature Amplitude Modulation» ) modulation in base band. The real and imaginary parts are interlaced temporally and multiplied by a sequence $\theta_k^n$. Two types of sequences $\theta_k^n$ can be used for example.

The first is defined by $\theta^n = j^{(n+k)}$ and the second is defined by $$\theta_k^n = \begin{cases} 1, j, 1, j, \ldots k \text{ even} \\ j, 1, j, 1, \ldots k \text{ odd} \end{cases}.$$

A block of OQAM symbols is obtained at the output of the OQAM pre-treatment module 10.

The OQAM symbols are applied E12 at the input of a synthesis filter bank 100 (i.e., « Synthesis Filter Bank», (SFB)) whereof the function is to form a multi-carrier signal from the OQAM symbols applied en input.

The output of the synthesis filter bank 100 is connected to the transmission channel 30 which delivers a received signal to the receiver 2.

Synthesis by filter bank consists of N oversamplers followed by N filters. The input signals of the synthesis filter bank 100 are first oversampled by N/2, then filtered by impulse response synthesis filters, $g_k[n]$. The $k^{th}$ filter being defined by:

$$g_k[n] = g[n] \cdot \exp\left(j \frac{2\pi k}{M}\left(n - \frac{L_p - 1}{2}\right)\right)$$

The filter g[n] is called a prototype filter of FBMC modulation and has a length $L_p$. In practice it is designed to be of size KN−1, KN or KN+1 where K is whole, in general, of low value (3, 4 or 5). The prototype filter is selected so that g(n) is real and g(n)*g(−n) is a Nyquist filter (perfect reconstruction) or similar (virtually perfect reconstruction), where * is the convolution product. In this case the prototype filter of the adapted filter is g(−n).

Figure 2A:
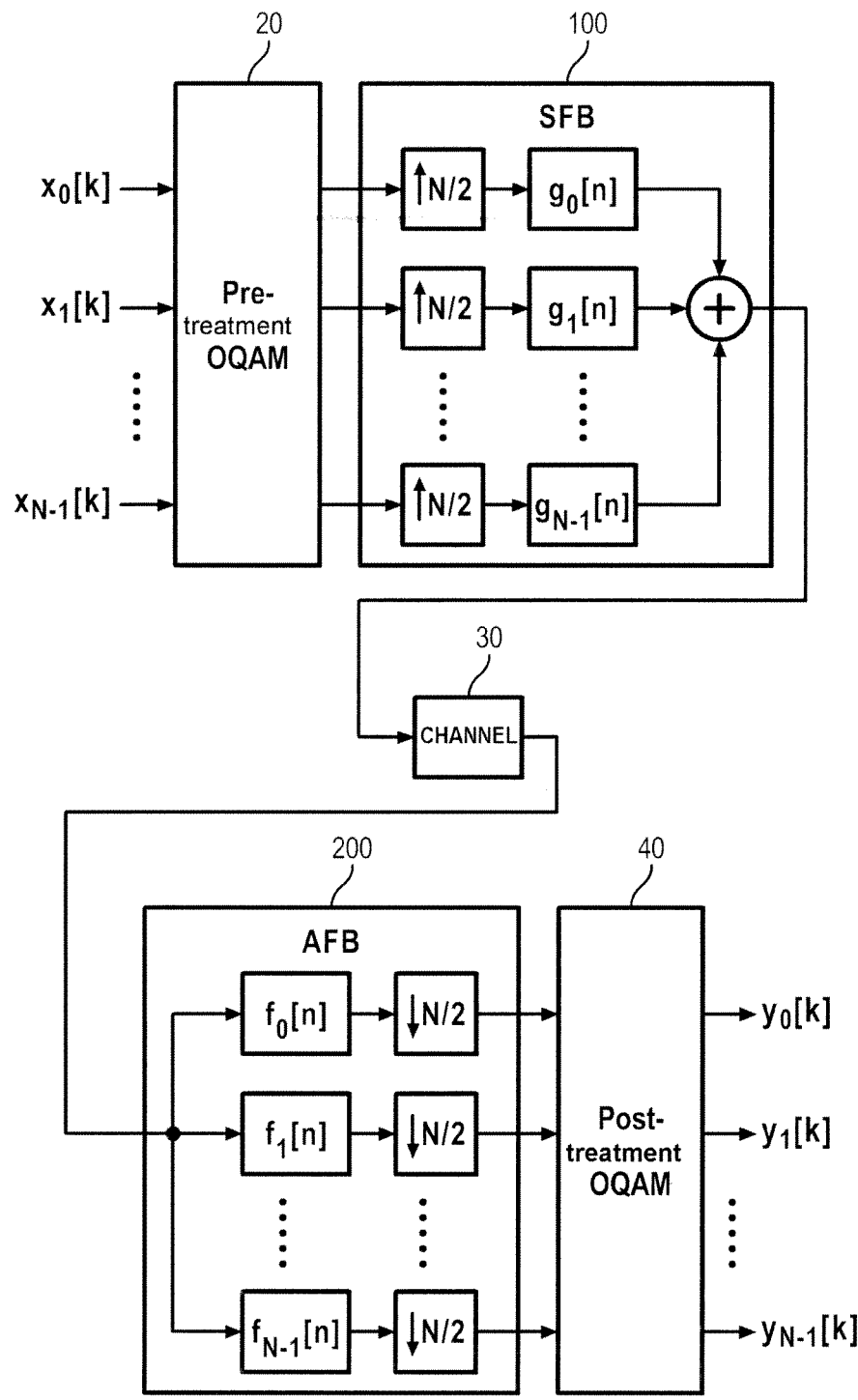
FIGS. 2a and 2b illustrate two send/receive diagram according to two embodiments of the invention.

The FBMC modulation filter bank selects the frequency response of each carrier and consequently the total frequency response of the transmitted signal. The property orthogonality between carriers is lost however. The orthogonality problem is corrected by transmitting real symbols (OQAM) at double the rhythm symbol of OFDM with guard interval and releasing the orthogonality condition to the only real field. FIG. 2a illustrates this synthesis by filter bank.

Figure 2B:
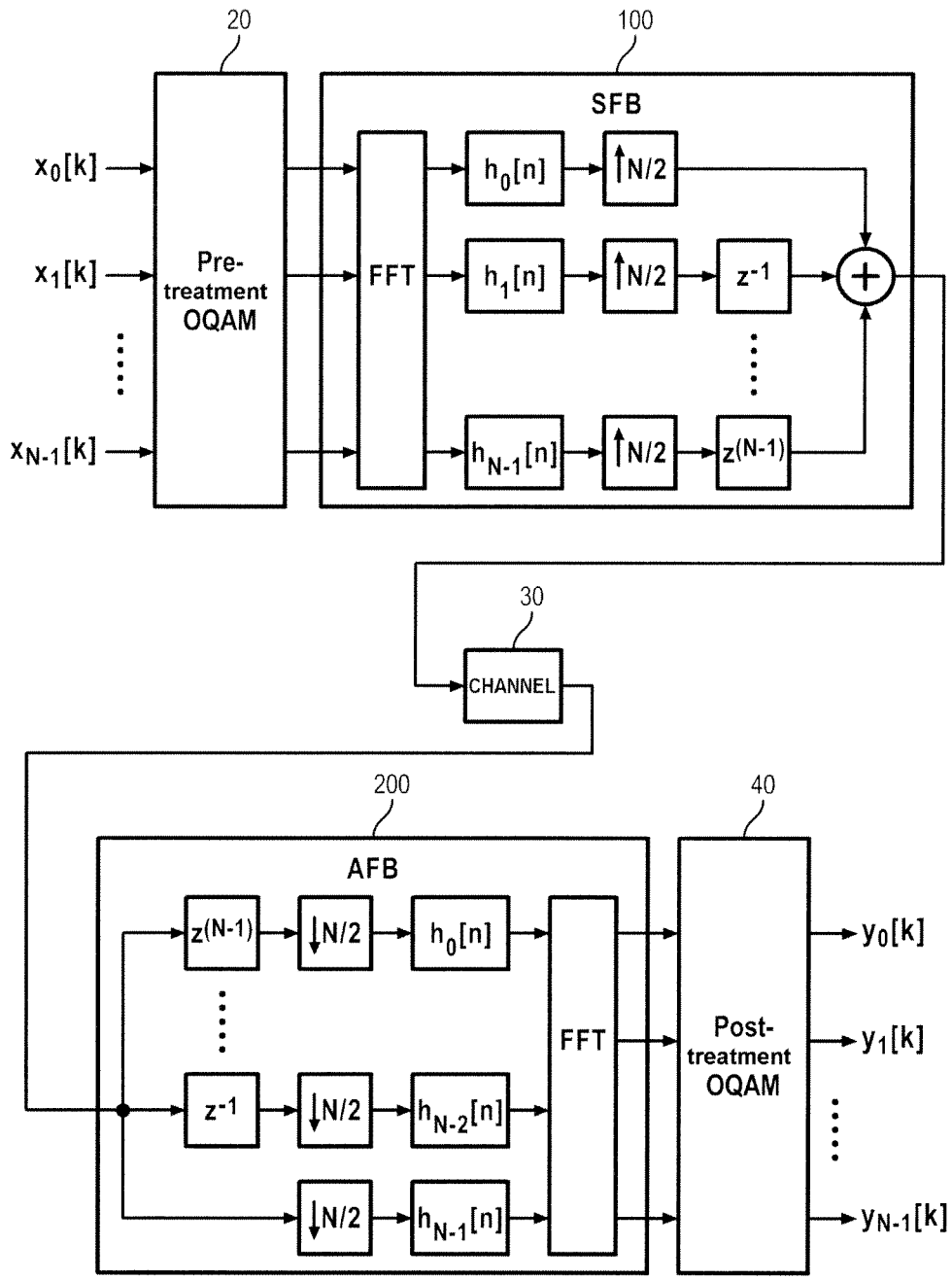

The same function can be implemented by using a polyphase structure followed by a Fourier transform. FIG. 2b illustrates such a configuration. It should be noted that this implementation also shows the analogy between the conventional OFDM and FBMC modulation and justifies the OFDM/OQAM modulation appellation.

At the level of the receiver 2, on receipt, the received signal is applied E13 to the input of an analysis filter bank 200 (i.e., <<Analysis Filter Bank>>, (AFB)). Analysis by filter banks is naturally complementary to synthesis by filter banks carried out on transmission. The analysis filter $f_k[n]$ is the adapted filter linked to the synthesis filter $g_k[n]$.

We define the set of N outputs of the analysis filter by a frequency symbol.

Following analysis by filter banks of the received signal, the latter is applied E14 to an OQAM post-treatment module 40 which is designed to reconstruct a transmitted QAM symbol. This is the inverse operation as performed by the OQAM pre-treatment module 20.

In particular, after derotation by the conjugated θ, OQAM post-treatment carried out conversion from complex to real, that is, only the real part of the signal is retained, while the part imaginary is discarded. It should be noted that in retaining only the real part of the signal, the orthogonality has no need to be preserved only on the real part of the signal, leaving the constraints on the imaginary part free. The orthogonality can in this case be defined by the fact that the transmitted signal is received without interference after demodulation.

Finally, serialisation E15 of symbols from the OQAM post-treatment module 40 is conduced by means of a parallel series (S/P) converter 50 to obtain a flow of N output data $y_n[k]$ n=[0, N−1].

For a more detailed description of the multi-carrier send/receive technique with filter banks reference could be made to the following documents, for example:

B. Hirosaki, "*An Orthogonally Multiplexed QAM System Using the Discrete Fourier Transform,*" Communications, IEEE Transactions on, vol. 29, no. 7, pp. 982-989, July 1981;

P. Siohan, C. Siclet, N. Lacaille, "*Analysis and design of OFDM/OQAM systems based on filterbank theory*", IEEE Trans. On Signal Processing, vol. 50, no. 5, pp. 1170-1183, May 2002.

Figure 3:
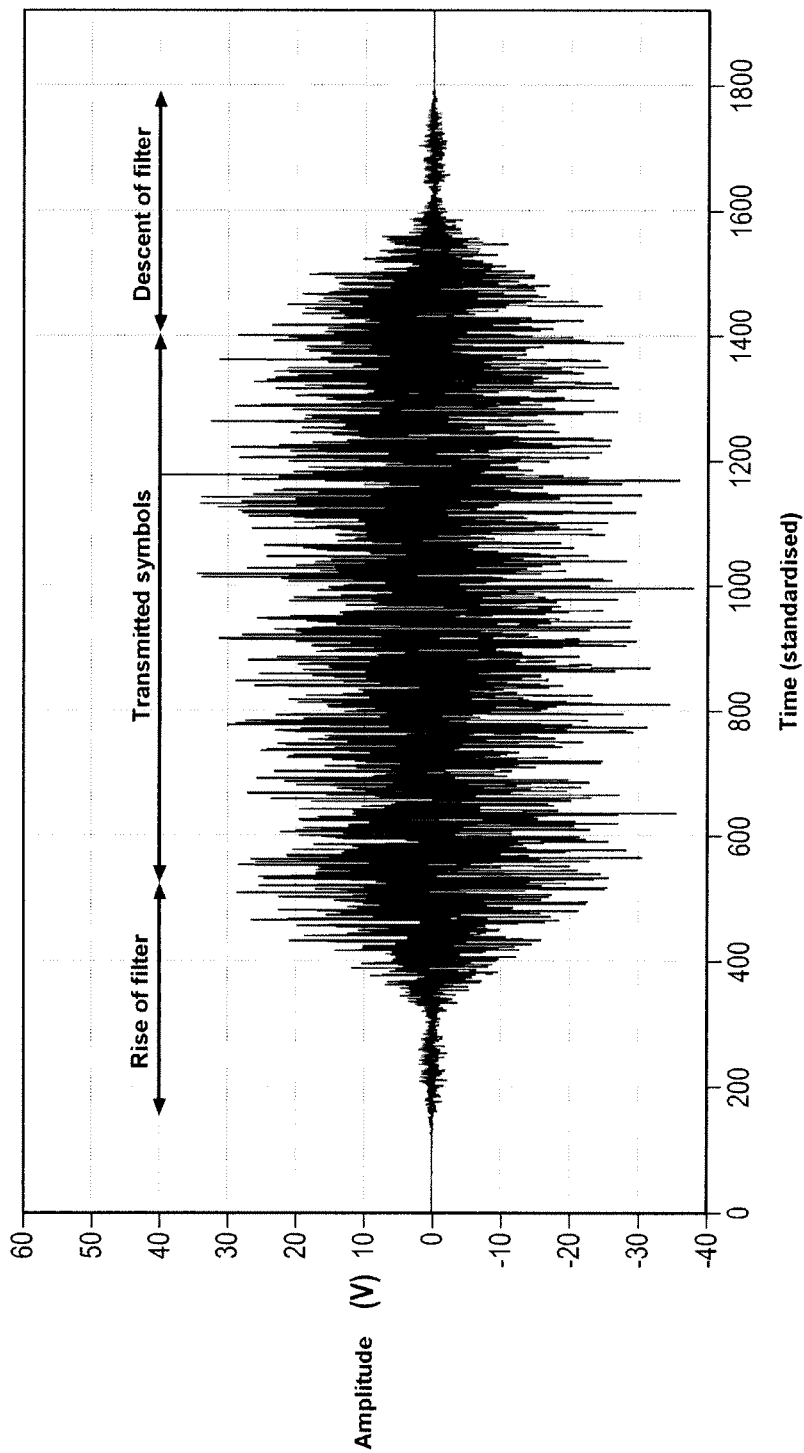
FIG. 3 illustrates a signal transmitted by the sending system of the invention.

As is known, the performance of the FBMC transmission system in transmission mode by packet is impacted by the duration of the prototype filter (the filter for forming the synthesis filter bank). If it is supposed that Nb blocks of N symbols must be transmitted, the transmitted packet commences by a rise time imposed by the prototype filter of duration (K−1)/2 of symbols blocks and a descent time of the same duration, increasing the duration of the packet by (K−1) symbols blocks. An example of a packet is illustrated in FIG. 3.

For transmissions by packet, synchronisation in time and frequency as well as estimation of channel conditions is done by inserting a synchronisation preamble before the useful data.

Figure 4:
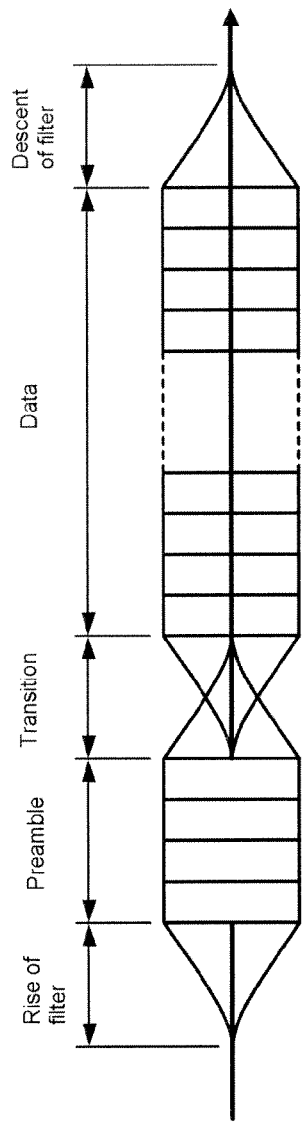
FIG. 4 illustrates the structure of a packet used in the send/receive system of the invention.
Figure 5:
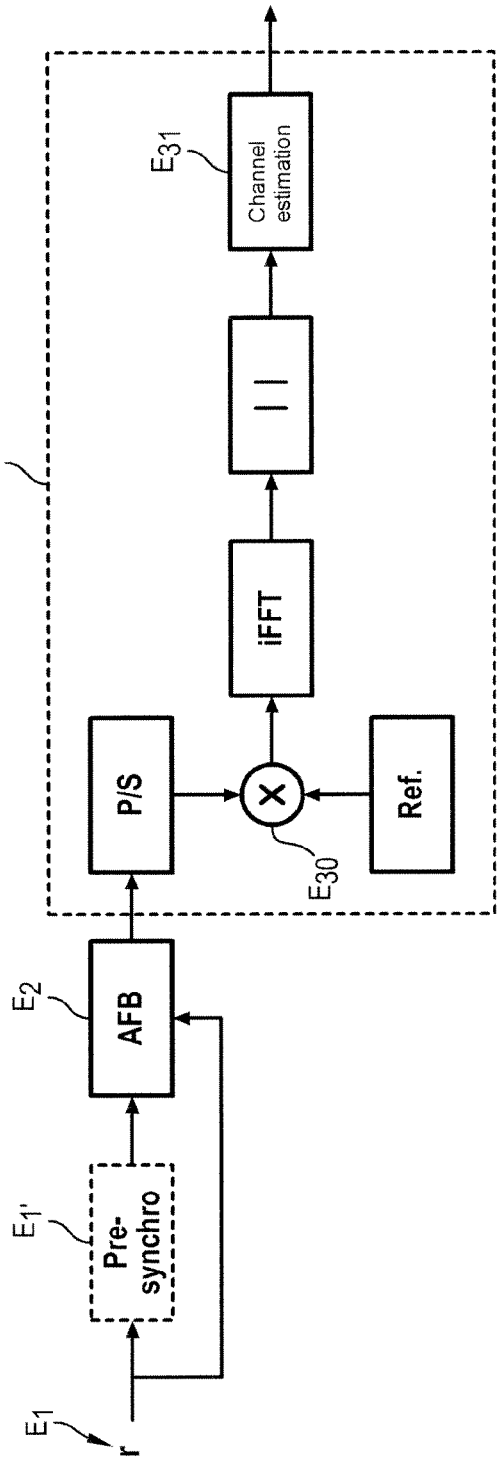
FIG. 5 illustrates a receive diagram according to an embodiment of the invention.

To prevent the transmitted useful data from interfering with the preamble it is necessary to introduce a number of silence time symbols equal to (K−1)/2 between the preamble packet and the data packet. FIG. 4 diagrammatically illustrates the structure of the packet comprising the synchronisation preamble followed by transition symbols (silence symbols) and data symbols.

In this way, a synchronisation phase is executed before demodulation of useful data at the level of the receiver to synchronise the transmitter 1 with the receiver 2.

This synchronisation phase is commonly known as acquisition phase (i.e., « lock» ) while the phase in which the useful data are demodulated is called a tracking phase (i.e., « tracking» ).

This synchronisation phase will allow the receiver 2 to detect the start of the packet so as to determine the placement of useful data. In particular, the symbols of the preamble are processed to:

estimate the frequency response of the channel;

estimate the temporal offsetting from the time response of the channel (obtained after moving to the time domain of the frequency response estimated by means of an iFFT).

By way of advantage synchronisation is executed by analysis of the received signal in the frequency domain.

In this way, contrary to those techniques discussed in the introduction, there is no need to install a device functioning independently of the analysis filter bank.

For synchronisation, a multi-carrier signal is received E1 from the transmitter 1 by the receiver 2. This signal comprises a preamble known from the receiver 2.

This signal undergoes analysis E2 by filter banks to extract the preamble.

The preamble is, as is understood, extracted in the frequency domain since it is used after filter bank analysis, contrary to known techniques.

Next, symbols of the preamble are treated E3 to obtain estimation data of the propagation channel 30 located between the transmitter 1 and the receiver 2.

The treatment E3 consists of operating at the inter-correlation E30 in the frequency domain, that is, after analysis by the filter bank and advantageously derotation by the $\theta_k^{n*}$ associated with symbols constituting the preamble with a reference signal.

In fact, by knowing the transmitted sequence, it is possible to estimate a priori the nature of the received sequence.

The received sequence is however not simple in general and depends on the transmitted sequence and on the type of filter used, the structure described here ensuring orthogonality only on the real part of the transmitted signal, that is, the real part of the transmitted signal and the same as the real part of the signal receives in ideal transmission conditions.

But interference transmitted on the imaginary part is a function of the real symbols transmitted and of the emission filter.

By correlating E30 the received frequency symbol term by term with the transmitted symbol an estimate of the frequency response of the channel can be deduced E31 therefrom and then an estimate of the time response of the channel by inverse FFT and therefore the start of the preamble.

In addition, the generated interference can be simply controlled when the same BPSK sequence is repeated at input of the modulator, on transmission of the signal, at the level of the transmitter 1.

In this way, a preamble comprising a sequence of BPSK symbols then coded in OQAM will preferably be selected. To get good performance, the block of BPSK symbols is repeated a number of times, at least two, preferably four times.

The OQAM pre-treatment will spread the BPSK symbols over non-consecutive carriers. In this case the interference generated on the adjacent carriers is a function of the BPSK symbol transmitted on the adjacent carriers which equates to a QPSK.

More precisely, if it is noted, $\epsilon_k$, the transmitted BPSK sequence, for k=0 to N where N is the number of relevant carriers. By definition of the BPSK modulation, $\epsilon_k$ can assume a value equal to −1 or 1. Conversion to OQAM (OQAM pre-treatment) before multiplication by the factor $\theta_k$ transforms this preamble sequence into two sub-sequences, $\chi_k^1$ and $\chi_k^2$, the first corresponding to the even symbols, the second to the odd symbols. The following property consequently results:

$$\chi_k^1 = \begin{cases} \epsilon_k & k \text{ even} \\ 0 & k \text{ odd} \end{cases}$$

$$\chi_k^2 = \begin{cases} 0 & k \text{ even} \\ \epsilon_k & k \text{ odd} \end{cases}$$

The signal received by the synthesis filter bank, in the absence of channel and noise supposing perfect synchronisation, constructs the similar QPSK reference sequence. This sequence before OQAM post-treatment (conversion of OQAM symbols to QAM symbols), but after derotation by the factor $\theta_k$, into two sub-sequences $\psi_k^1$ and $\psi_k^2$, the first corresponding to the even symbols, the second to the odd symbols received, with the following property:

$$\psi_k^1 \approx \begin{cases} \varepsilon_k + j\xi_k^1 & k \text{ even} \\ j\xi_k^1 & k \text{ odd} \end{cases}$$

$$\psi_k^2 \approx \begin{cases} j\xi_k^2 & k \text{ even} \\ \varepsilon_k + j\xi_k^2 & k \text{ odd} \end{cases}$$

With $\xi_k^1$ and $\xi_k^2$ able to assume values of 0, −1, or 1, and function of the BPSK sequence, $\epsilon_k$, as transmitted.

In the presence of a channel the sequences $\psi_k^1$ and $\psi_k^2$ are then filtered and made noisy by the channel 30. It is evident that in the presence of a channel, $H_k$, stationary during the training sequence, the sequence received after Fourier transform (FFT) and after derotation by $\theta_k^{n*}$, $\rho_k^n$ can be approximated by:

$$\rho_k^{2n} \approx H_k(\psi_k^1)e^{j\pi\Delta f 2n} \cdot e^{j\frac{2\pi k \Delta \tau}{T}} + \eta_k^{2n}$$

and $$\rho_k^{2n+1} \approx H_k(\psi_k^2)e^{j\pi\Delta f(2n+1)} \cdot e^{j\frac{2\pi k \Delta \tau}{T}} + \eta_k^{2n+1}$$

where $\Delta f$ is the residual frequency error received after demodulation, $\Delta\tau$, the residual error linked to poor alignment of the frequency symbol. T the duration of a symbol block, and $\eta_k^n$ a noise term.

The correlation of this signal received by the reference signal can in a trivial way then make a correlation in the frequency domain, if $\rho_k^n$ is the sequence received after FFT and before OQAM post-treatment, but after derotation by $\theta_k^{n*}$, the following formula can be applied:

$$\Gamma_k^n = \rho_k^n \cdot (\psi_k^1)^* + \rho_k^{n+1} \cdot (\psi_k^2)^*.$$

Given the trivial values of $\psi_k^1$ and $\psi_k^2$, the value $\Gamma_k^n$ is a simple sum and calculation of a product is not required.

The result can then be used to deduce the alignment of the frequency symbol and the error in frequency. Indeed, the successive values of $\Gamma_k^n$ ($\Gamma_k^{n+1}$) may permit to estimate the residual error in frequency by the complex conjugate product and summation over the k active carriers. An inverse Fourier transform may be applied over the values $\Gamma_k^n$ for k from 0 to M, (or to the average of several $\Gamma_k^n$) to deduce the impulse response of the channel and therefore the exact start of the preamble. Indeed, the combination of $H_k$ and $$e^{j\frac{2\pi k \Delta \tau}{T}}$$

constitutes, after the inverse Fourier transform, to the impulse response shifted of the error linked to the temporal alignment of the preamble.

As a consequence, the imaginary part of the signal received in ideal transmission conditions assumes values very close to 0, 1 or −1. Also, when a signal of BPSK type is output, some coefficients of the prototype filter are systematically multiplied by a zero OQAM value, due to BPSK-to-OQAM conversion.

In this way the interference caused to the adjacent carrier is of module very close to 0.5. As each carrier has two adjacent carriers, the overall interference is of module 0 or −1, 1 where the interferences are added or subtracted.

To improve performance, pre-synchronisation E1' can be implemented according to a known process for example described in documents A. Petrella, « *Synchronization algorithms for FBMC systems* », doctoral thesis, Université Frederic II de Naples, 2008/2009 and Morelli, M.; Kuo, C.-C. J.; Pun, M.-O., « *Synchronization Techniques for Orthogonal Frequency Division Multiple Access (OFDMA): A Tutorial Review,* » Proceedings of the IEEE, vol. 95, no. 7, pp. 1394-1427, July 2007.

The effect of this pre-synchronisation is to correct the frequency error before treatment of the preamble in the frequency domain to conduct fine synchronisation of the transmitter with the receiver.

Pre-synchronisation is therefore coarse synchronisation of the receiver 2.

Figure 6:
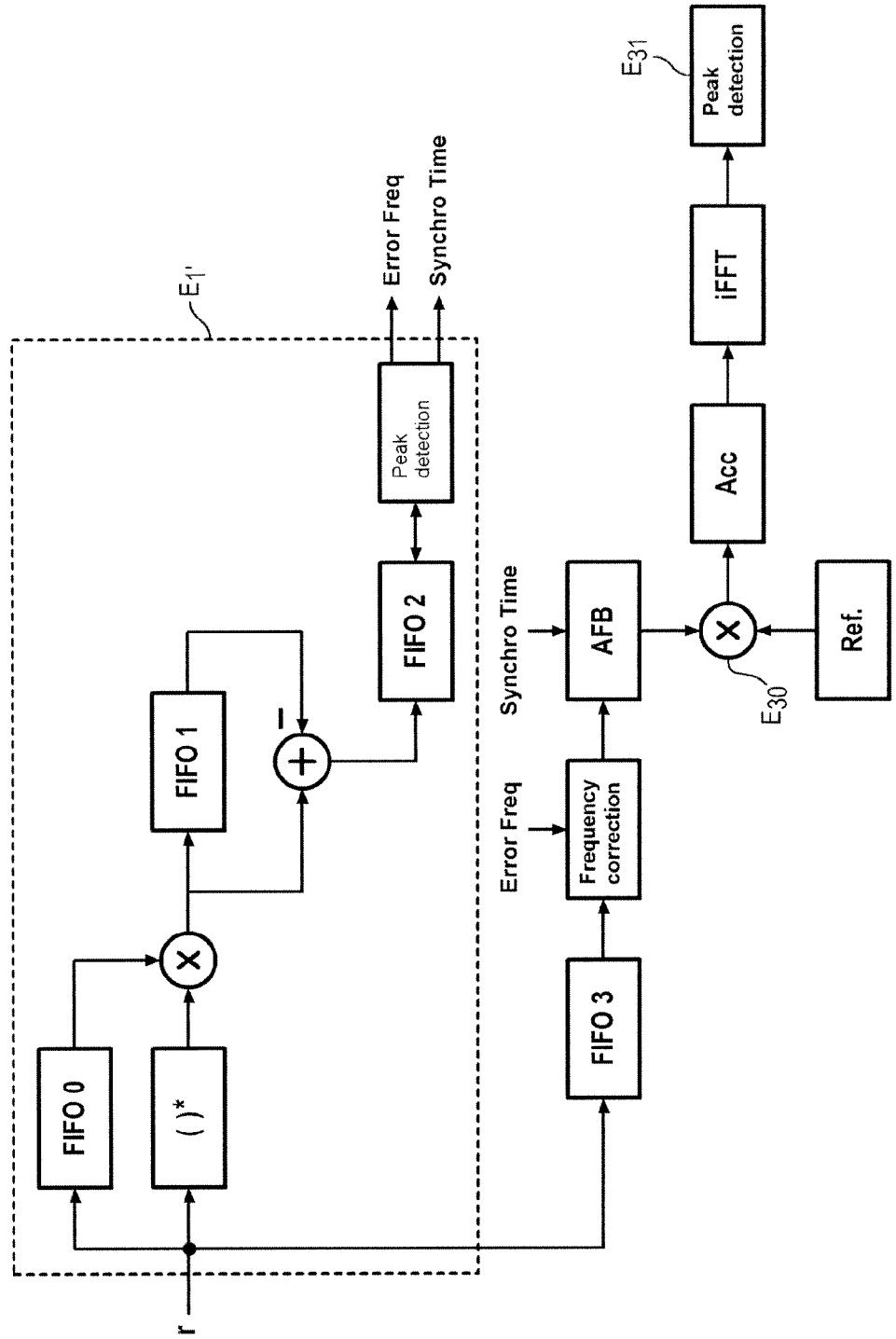
FIG. 6 illustrates a receive diagram according to another embodiment of the invention.

FIG. 6 illustrates possible implementation of a synchronisation process.

The received signal r is correlated with itself then accumulated to be stored in memory of FIFO type (i.e., « First In First Out »).

A peak detection algorithm evaluates whether a packet start has been detected. It allows estimation of the error in frequency (Erreur Freq) if there has been detection using one of the methods proposed in one of the documents cited above. It also enables estimation of temporal offsetting (Synchro Temps).

After detection, a second data path applies frequency correction and proceeds with analysis by filter bank of the signal using the coarse synchronisation information (Erreur Freq, Synchro Temps). The signal is then correlated term by term with the reference signal and an channel estimate in the frequency domain is deduced from this. The channel estimate is accumulated on one or more OQAM symbols and a fast inverse Fourier transform (iFFT) is applied to it.

The exact start of preamble can be detected by detection E31 of the amplitude peak of the channel impulse response.

The invention claimed is:

1. A method for processing a received signal (r) from a multi-carrier transmitter (1) with filter banks, by a multi-carrier receiver (2) with filter banks, the method comprising the steps of:
    receiving (E1) by a multi-carrier receiver a multi-carrier signal transmitted by a multi-carrier transmitter (1) comprising filter banks, said multi-carrier signal being generated to a filter bank synthesis of several sub-strings of OQAM symbols, the received multi-carrier signal comprising a synchronisation preamble known by the multi-carrier receiver (2), said preamble of the signal being a sequence of BPSK symbols, the sequence of BPSK symbols having been pre-coded in OQAM by the multi-carrier transmitter (1) at the transmission of the multi-carrier signal;
    analysing (E2) by filter banks of the multi-carrier received signal (r) so as to extract the preamble in a frequency domain;
    processing (E3) the extracted preamble for obtaining an estimation of data of a propagation channel (30) located between the multi-carrier transmitter and the multi-carrier receiver.

2. The method as claimed in claim 1, in which the processing step (E3) comprises of:
    correlating (E30) the preamble with a reference signal to obtain a correlation signal;
    determining (E31), from the correlation signal and from the frequency response of the propagation channel, an estimate of the time response of the propagation channel.

3. The method as claimed in claim 1, in which the number of BPSK symbols is such that the preamble comprises at least two, preferably four, OQAM symbols.

4. The method as claimed in claim 2, in which the reference signal comprises a succession of BPSK or QPSK symbols.

5. The method as claimed in claim 1, comprising a transmitting step consisting of
- converting (E10) a sequence of data into a number of sub-strings equal to the number of active carriers;
- converting (E11) each sub-string into a set of sequences of OQAM symbols;
- applying (E12) to the input of a synthesis filter bank the sequences of OQAM symbols to obtain a multi-carrier signal to be sent.

6. The method as claimed in claim 1, comprising after receipt of the signal, a pre-synchronisation step (E1') including correlating the received signal with its rejoinder offset in time to obtain offsetting in frequency and in time between the transmitted signal and received signal, with analysis by filter banks being a function of the resulting offsettings.

7. The method as claimed in claim 1, in which analysis by filter bank includes obtaining several sub-strings of symbols constituting the preamble, the treatment of the preamble consisting also of converting the sub-string of symbols into a sequence of symbols.

8. The method as claimed in claim 1, in which the filter banks (100, 200) comprise a fast Fourier transform module.

9. A multi-carrier digital communications system with filter banks, comprising a multi-carrier transmitter and a multi-carrier receiver with filter banks, the communications system being configured for executing a process as claimed in claim 1.

* * * * *